United States Patent [19]

Upatnieks

[11] Patent Number: 4,643,515
[45] Date of Patent: Feb. 17, 1987

[54] METHOD AND APPARATUS FOR RECORDING AND DISPLAYING EDGE-ILLUMINATED HOLOGRAMS

[75] Inventor: Juris Upatnieks, Ann Arbor, Mich.

[73] Assignee: Environmental Research Institute of Michigan, Ann Arbor, Mich.

[21] Appl. No.: 718,502

[22] Filed: Apr. 1, 1985

[51] Int. Cl.$^4$ .................. G03H 1/04; G03H 1/22
[52] U.S. Cl. .................. 350/3.67; 350/3.83; 350/3.85; 350/320
[58] Field of Search .......... 350/3.83, 3.84, 3.81, 350/3.85, 320, 3.67

[56] References Cited

U.S. PATENT DOCUMENTS 3,635,540  1/1972  Nassenstein ............ 350/3.61 X
4,012,150  3/1977  Upatnieks ............... 356/247
4,223,975  9/1980  Upatnieks ............... 350/3.68

FOREIGN PATENT DOCUMENTS 0126273  9/1980  Japan ..................... 350/3.81

Primary Examiner—Bruce Y. Arnold
Attorney, Agent, or Firm—Krass & Young

[57] ABSTRACT

Methods and apparatus for recording and displaying edge-illuminated holograms. Disclosed is a method for producing holograms whereby the reference beam, when recording, and the illumination beam, when displaying the hologram, impinge on the edge of the cover plate placed over the hologram. Edge-illumination of holograms makes possible holographic displays which fit in a volume having very little depth.

15 Claims, 4 Drawing Figures

4,643,515

METHOD AND APPARATUS FOR RECORDING AND DISPLAYING EDGE-ILLUMINATED HOLOGRAMS

FIELD OF THE INVENTION

This invention relates to methods and apparatus for recording and displaying holograms and, more particularly, to methods and apparatus for recording and displaying holograms using edge illumination.

BACKGROUND OF THE INVENTION

The use of holograms for recording and displaying information is being applied to an ever-widening range of fields including advertising displays, head-up displays and the like.

The recording of a hologram of an object is accomplished by establishing an interference pattern between an object wavefront scattered by the object and a reference wavefront, the two wavefronts being mutually coherent. An image of the object is reconstructed from the hologram with an illumination wavefront which is usually directed onto the hologram at the same angle as the reference wavefront. For complete illumination of the hologram, the reference wavefront (usually generated from a point source of light) must be located a relatively large distance from the hologram. The resulting playback geometry occupies a large distance in the direction perpendicular to the hologram. In many applications, this space requirement complicates the installation of a system which relies on holographic readouts.

When using a transmission hologram the brightness of the light transmitted through the hologram may exceed the brightness of the image formed by the diffracted energy, making the image difficult to see. The transmitted light may also exceed safe light levels since it does not originate from a diffusely reflecting surface. In addition, ambient light shining on the hologram may be diffracted by the hologram, forming objectionable stray light. This diffracted ambient light can interfere with the performance of the holographic readout system.

Consequently, the need exists for improvements in developing compact holographic systems which will offer greater flexibility in their installation, improved contrast with the illuminating light and low levels of diffracted stray light.

SUMMARY OF THE INVENTION

The present invention provides a method for producing and displaying holograms using edge illumination in the reference and reconstruction beams. With the illumination being directed at the hologram from an edge, the reconstruction light source can lie much more nearly in the plane of the hologram.

In recording the edge-illuminated hologram, a light-sensitive medium (typically a photographic plate) is placed under a cover plate, with a layer of liquid between the cover plate and light-sensitive medium. The object beam is formed in the normal way, the light scattered by the object being reflected to the cover plate.

The reference beam, however, enters an edge of the cover plate. This reference beam is refracted out of the glass plate only in the direction toward the light-sensitive medium, not in the direction of the plate exposed to the environment. These retroactive effects occur as a result of two facts: (1) the index of refraction of the liquid is greater than or equal to that of the cover plate, whereas that of air is less and (2) the reference beam is at a shallow angle with respect to the two cover plate surfaces. The reference waveform impinges on the outer surface of the cover plate at an angle which is too shallow to allow any light to be refracted out of the cover plate. In other words, on this surface, all of the reference beam light is reflected due to total internal reflection. On the other surface of the cover plate, that touching the coupling liquid, however, refraction of the reference beam from the cover plate does occur.

In reproducing the image recorded by the hologram, the illumination beam is also directed to the edge of the cover plate. It can be directed from the same apparent point on the reference beam the light which is refracted out of the cover plate toward the hologram is diffracted by the hologram and creates a virtual image of the original object. The illuminating beam or reconstructed image are, therefore, not affected by contamination on the surface of the cover glass.

Further, any ambient light striking the hologram after entering through the surface of the cover plate directed toward the user will be diffracted and refracted back to the cover plate. This light will be contained wtihin the cover plate. Therefore, ambient light will not create undesirable additional images or stray light.

Variations on the mode of edge-illumination are possible. For example, a diffraction grating can be placed on the edge of the hologram or a mirror can be placed perpendicular to the illuminated edge. These provide alternate ways of illuminating the hologram using multiple internal reflections. The hologram can be completely illuminated with an appropriate choice of illumination parameters. Further, illuminating the cover plate with a converging beam can produce a real holographic image, if desired.

Of course, a "frame" apparatus can be made which will incorporate the necessary light source and optical elements, including fiber optic cables, if desired, to provide for an edge-illuminated hologram.

DETAILED DESCRIPTION OF THE PREFERRED EMBODIMENT

Figure 1:
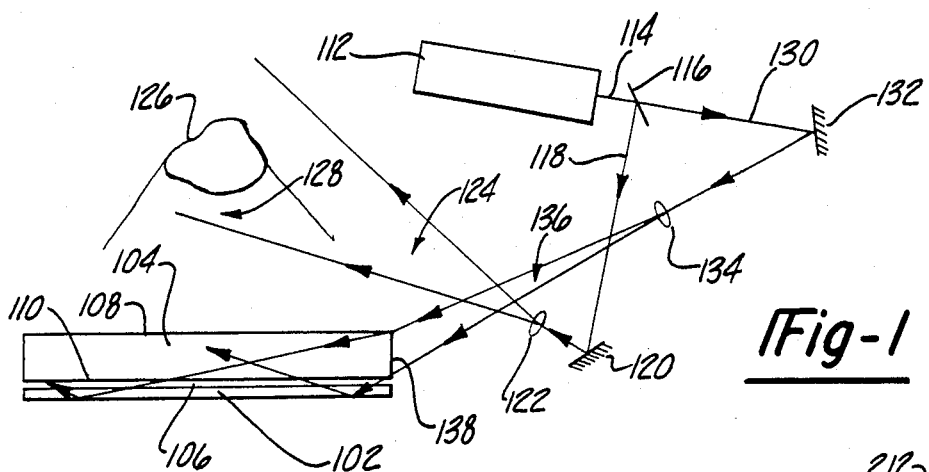
FIG. 1 is a cross sectional view showing the recording geometry for an edge-illuminated hologram.

Referring now to the drawings, and in particular to FIG. 1, a planar light-sensitive medium 102 is disposed in close proximity with a cover plate 104. Between the light-sensitive medium 102 and the cover plate 104 is a thin layer 106 of coupling liquid, having an index of refraction equal to or greater than the index of refraction of the material from which the cover plate 104 is made. Cover plate 104 has one face 108 directed toward the object to be recorded and a second surface 110 which is immersed in the coupling liquid 106.

A coherent light source 112, such as a laser, produces a beam 114 which, upon striking a beam splitter 116, creates two beams.

The illumination beam 118 strikes a mirror 120 which reflects it to a diverging lens 122, producing a coherent light wavefront 124 which bathes the object 126. The object reflects an object wavefront 128 which illuminates surface 108 of the cover plate 104. The light which refracts through the cover plate 104 and the coupling liquid 106 then passes through the light-sensitive medium 102.

The beam splitter 116 transmits the reference beam 130 which reflects from a mirror 132 and strikes a diverging lens 134, creating a wavefront 136 which strikes an edge 138 of the cover plate 104. Wavefront 136 is refracted as it passes through cover plate edge 138, creating a wavefront inside the cover plate 104.

Snell's law controls whether a light beam will be refracted when it impinges on a surface defining an interface between materials having different indexes of refraction. Where a light ray passing through an object with index of refraction $n_1$ impinges upon the interface surface with an object having an index of refraction $n_2$, so that the angle of this impingement as measured from a normal to the impingement surface is $\theta_1$, the ray is refracted at an angle $\theta_2$ from the surface normal in accordance with the formula $$\sin(\theta_2) = n_1 \sin(\theta_1)/n_2.$$

By requiring that the index of refraction $(n_l)$ of the coupling liquid 106 be greater than that $(n_p)$ of the material making up the cover plate 104, it is clear that a light ray being refracted into the coupling liquid is more nearly normal to the interface surface than is the impinging ray in the cover plate 104. On the other hand, at the other surface 108 of the cover plate 104 which borders on air having an index of refraction $n_a$ which is less than $n_p$, the light rays will not be refracted out of the cover plate unless the angle $\theta_p$ satisfies the equation $\sin \theta_p \leq n_a/n_p$. In other words, if the rays can be caused to graze the two surfaces 108 and 110, only light striking 110 will be refracted out of the cover plate.

The light refracted out of cover plate surface 110 passes through the coupling liquid 106 and forms interference patterns, in light-sensitive medium 102, with the object wavefront 128 which is transmitted through the cover plate 104 and coupling liquid 106 to the light-sensitive medium 102. The fringes produced by this interference are recorded in the light-sensitive medium 102. Following appropriate chemical processing, which fixes these interference fringes in the photographic medium 102, a hologram results.

Figure 2:
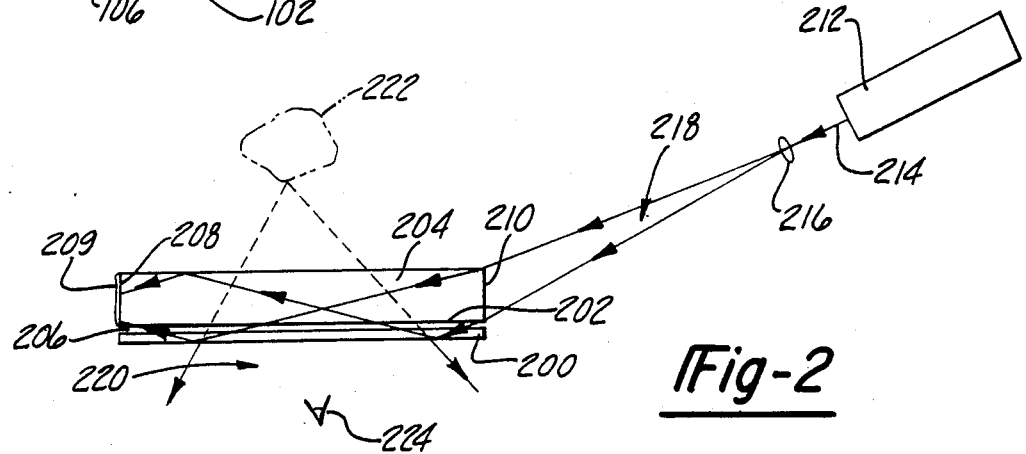
FIG. 2 shows a cross sectional view of an apparatus for reconstructing the virtual image recorded by the apparatus of FIG. 1.

Referring now to FIG. 2 of the drawings, an explanation of a method and apparatus for displaying an edge-illuminated hologram can be given. A hologram 200 recorded in accordance with the recording procedure outlined above is placed in proximity with one surface 202 of the cover plate 204. The cover plate 204 and the hologram 200 are separated by a layer of coupling liquid 206. The dimensions of the cover plate 204 and the thickness of the coupling liquid layer 206 are substantially equal to those provided in the recording apparatus.

Laser 212, producing substantially the same wavelength of light as laser 112 in the recording geometry shown in FIG. 1, produces a beam 214 which strikes a diverging lens 216 to produce an illuminating wavefront 218. Edge 210 of cover plate 204 serves to admit the illuminating coherent light. The placement of laser 212 and lens 216 are such as to cause the illumination of edge 210 of cover plate 204 to be substantially identical to the illumination of the corresponding parts in FIG. 1. Edges of the cover plate 204 which are not illuminated by wavefront 218, such as edge 208 is painted with opaque paint 209, thereby absorbing any light energy which should reach them and preventing the creation of undesirable multiple images.

Impinging on edge 210, illuminating wavefront 218 is refracted at the air-glass interface represented by edge 210. The amount by which each ray within illuminating wavefront 218 is refracted is determined by the angle of incidence and the relative indexes of refraction on the two sides of edge 210. In this preferred embodiment, these parameters are assumed to be identical with those of the recording geometry shown in FIG. 1. Therefore, the light wavefronts produced in cover plate 204 are identical with those produced by cover plate 104 in FIG. 1, upon illumination by reference wavefront 136.

All other parameters being substantially identical, portions of the wavefront are diffracted out of the cover plate 204 through the coupling liquid layer 206 and into the hologram 200 where they are diffracted to produce image wavefront 220. This wavefront is perceived by an observer 224 to be a virtual image 222 of the recorded object 126 in FIG. 1.

Figure 3:
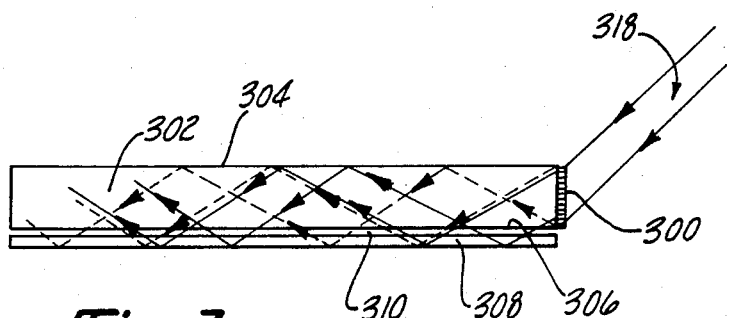
FIG. 3 shows a first alternate method for completely illuminating an edge-illuminated hologram, using multiple internal reflections.

Because it is possible that image produced by illumination of a hologram in accordance with FIG. 2, where such hologram was recorded in accordance with the procedure discussed with reference to FIG. 1, a wavefront providing more uniform illumination is desirable. With reference to FIG. 3 of the drawings, one method of accomplishing is shown.

By proper construction of the recording and displaying apparatus, along with proper choice of sizes of the glass plate to be used, a method for producing or illuminating light energy by generating multiple internal reflections is possible. FIG. 3 shows a wavefront 318 (which could be either the reference wavefront corresponding to the reference wavefront 136 in FIG. 1, or the reproducing wavefront 218 in FIG. 2). FIG. 3, therefore, shows both the effect of the reference wavefront in the recording of the holgram and of the illuminating wavefront in displaying the hologram which results in the recording. Wavefront 318 impinges upon diffraction grating 300, resulting in portions of wavefront 318 being refracted, as before, and other portions of wavefront 318 being diffracted, to produce additional wavefronts within the cover plate 302. Because the angles of incidence with a surface 304, which represents an interface between the glass cover and air, are too large to allow refraction, total internal reflection results. Surface 306, on the other hand, which is displaced from layer 308 (an undeveloped light-sensitive medium in the record phase and a developed hologram in the display phase), by a coupling liquid layer 310, allows wavefronts to be refracted out of the cover plate 302. These produce the desired record or reproduce wavefronts in the layer 308.

Figure 4:
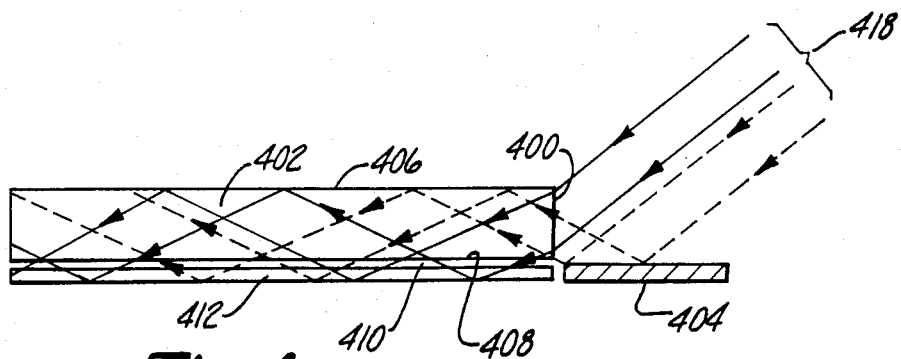
FIG. 4 shows a second alternate method for completely illuminating an edge-illuminated hologram using multiple internal reflections.

Another alternate method of recording and displaying an edge-illuminated hologram is shown in FIG. 4 of the drawings. Here wavefront 418 impinges partly on edge 400 of the plate cover 402 and partly on a mirror 404. The portions of wavefront 418 which illuminate edge 400 cause wavefronts to be refracted and generated in plate cover 402 as described above. Portions of wavefronts 418 which are reflected from mirror 404 before impinging upon edge 400 are also refracted and give rise to a second set of wavefronts within cover plate 402. Because this second set of wavefronts has substantially the same angle of impingement upon surface 406 as the first set, the total internal reflection of both sets of wavefronts is produced at surface 406. In a similar manner, wavefronts contained in cover plate 402 are refracted out of edge 408 which is in contact with a coupling liquid 410 and in proximity to plate 412 (which could be either a light-sensitive medium or a developed hologram, depending on whether a recording or displaying function is being described).

Among other advantages which will be obvious to one skilled in the art, are that (a) the reproducing wavefront can be confined entirely within the space to one side of the hologram, which can be completely enclosed (the only light emanating from the hologram is that of the image), (b) scattering of light by surface contamination, such as water droplets or dirt on the cover plate, will not affect the illuminating beam or the quality of the reconstructed image, (c) light from the sun or other bright sources is diffracted into the glass plate and remains invisible to the observer, and (d) the holograms produced by the is method may be of either the transmission or reflection type, and (e) either the real or virtual image may be made available for use.

I claim:

1. A method for recording a hologram, comprising:
    placing a recording medium sensitive to electromagnetic energy in proximity to a body refractive of electromagnetic energy, said body having a plurality of surfaces and being adapted to refract electromagnetic energy impinging on at least a first of said plurality of surfaces onto said recording medium, the index of refraction of the body being greater than the index of refraction of the space adjacent said first of said plurality of surfaces;
    filling the space between said recording medium and said refractive body with a layer of material transparent to electromagnetic energy, said material having an index of refraction greater than or equal to the index of refraction of said refractive body;
    forming a plurality of beams from a coherent source of electromagnetic energy;
    creating an object wavefront by illuminating an object to be holographically recorded with a first of said plurality of beams;
    directing a portion of said object wavefront to impinge on said first of said plurality of surfaces, said portion being refracted onto said recording medium;
    creating a reference wavefront within said reflective body by directing a second of said plurality of beams onto a second of said plurality of surfaces;
    exposing said recording medium to the portion of said reference wavefront impinging on said second of said plurality of surfaces and being refracted onto the recording medium, creating an electromagnetic interference pattern between said wavefronts within the recording medium; and
    rendering said interference pattern permanent in said recording medium.

2. The method of claim 1, wherein said electromagnetic energy is light energy.

3. The method of claim 2, wherein said recording medium is a photographic plate.

4. The method of claim 1, wherein said refractive body has two parallel planar surfaces, one being said first of said plurality of surfaces.

5. The method of claim 4, wherein said second of said surfaces is not parallel to said first of said surfaces.

6. The method of claim 5, wherein said electromagnetic energy is light energy.

7. The method of claim 6, wherein said photosensitive medium is a photographic plate.

8. A method for recording an edge-illuminated hologram, comprising:
    placing a photographic plate substantially parallel to a first planar surface of a transparent cover plate, said cover plate having a second planar surface parallel to the first and a third planar surface perpendicular to the first and second surfaces;
    filling the space between said photographic plate and said cover plate with a layer of transparent material having an index of refraction greater than or equal to the index of refraction of the cover plate;
    forming two beams from a laser source of light;
    illuminating an object to be holographically recorded with a first of said beams, creating an object wavefront;
    directing a portion of said object wavefront to impinge on said second surface of said cover plate;
    illuminating said third of said planar surfaces with the second of said light beams;
    exposing said photographic plate to an interference pattern between said wavefront in the photographic plate; and
    fixing said interference pattern in said photographic plate.

9. A method for displaying a hologram, comprising:
    placing a hologram in proximity to a body refractive of electromagnetic energy, said body having a plurality of surfaces and being adapted to refract electromagnetic energy impinging on at least a first of said plurality of surfaces onto said hologram, the index of refraction of the body being greater than the index of refraction of the space adjacent said first of said plurality of surfaces;
    filling the space between said hologram and said refractive body with a layer of material transparent to electromagnetic energy, said material having an index of refraction greater than or equal to the index of refraction of said refractive body; and
    illuminating a selected subset of said surfaces with a plurality of beams of coherent electromagnetic energy, a portion of each beam of said plurality being refractively transmitted to said hologram and creating a displayed image.

10. The method of claim 9, wherein said electromagnetic energy is light energy.

11. A method for displaying an edge-illuminated hologram, comprising:
    placing a hologram in uniformly displaced proximity to a first parallel surface of a transparent cover plate, said cover plate having a second planar surface parallel to said first parallel surface and an edge surface perpendicular to said first and second planar surfaces, the space between said photographic plate and said cover plate being filled with transparent material having an index of refraction greater than or equal to that of the material of the cover plate; and
    illuminating said edge surface with a laser light beam, a portion of said light beam being refractively transmitted to said hologram and creating a displayed image.

12. An apparatus for displaying an edge-illuminated hologram comprising:
   a hologram;
   means refractive of electromagnetic energy, having a plurality of surfaces, a first of said surfaces adapted to receive a hologram in proximity, for refracting electromagnetic energy from the first surface onto the hologram;
   a layer of material transparent to electromagnetic energy filling the space between said hologram and said first of said surfaces, said material having an index of refraction greater than or equal to the index of refraction of said first of said surfaces;
   means for providing electromagnetic energy; and
   means adapted to illuminate a second of said surfaces with said electromagnetic energy for refractively illuminating the hologram.

13. The apparatus of claim 12, wherein said electromagnetic energy is light energy.

14. The apparatus of claim 13, wherein said first and second surfaces are planar and whose planar extensions intersect.

15. An apparatus for displaying an edge-illuminated hologram comprising:
   a hologram;
   transparent cover plate means having a planar surface adapted to receive a hologram in uniformly displaced proximity and an edge surface perpendicular to said planar surface;
   a layer of material transparent to electromagnetic energy filling the space between said hologram and said cover plate, said material having an index of refraction greater than or equal to the index of refraction of said cover plate;
   light source means; and
   means adapted to illuminate said edge surface with light produced by said light source means for refractively illuminating the hologram.

* * * * *